// 276,806

UNITED STATES PATENT OFFICE.

JULIUS GÜNTHER, OF QUINCY, ILLINOIS.

STARCH.

SPECIFICATION forming part of Letters Patent No. 276,806, dated May 1, 1883.

Application filed October 9, 1882. (No specimens.)

*To all whom it may concern:*

Be it known that I, JULIUS GÜNTHER, of Quincy, Adams county, and State of Illinois, have invented a new and useful Improvement in Starch, of which the following is a full, clear, and exact description.

This invention consists in a mixture with starch of suitable chemical substances, whereby I produce what I term "fire-proof starch," which, while it may be used as ordinary starch, is used for stiffening and giving gloss to washed clothes and fabrics, without injuring their texture or fibers, gives a fire-proof character to the goods, or, in other words, makes inflammable goods incapable of being inflamed or of kindling into a blaze.

The importance of the invention will be readily recognized when we consider the number of appalling accidents which have occurred from time to time, involving the sacrifice of thousands of lives as well as valuable property by the burning of highly-inflammable materials or articles—such as wearing-apparel, curtains, paper ornaments, bedding, and other goods—when brought in contact with flame. Numerous substances in solution have been proposed and employed to prevent such occurrences, the same being used as a special and separate means to impregnate the goods, or as a surface coating applied by brush; but the best of these, which only admit of a charring of the goods, even if not injurious to the goods or detracting from their appearance, are but seldom adopted, because, after washing and starching the inflammable articles it requires extra labor to apply said solution, or even if added to the boiled starch it requires particularity as regards quantity and attention as to the adding of them, which is apt to be neglected. By making the starch itself, however, before boiling or mixing it for use, possess the fire-proof properties which it is desirable to impart to the fabrics, and so that it may be applied in the same manner as ordinary starch for the starching of laundry goods, the desired result is attained, and nothing is left for personal care or particularity, and by my improved starch not only may wearing-apparel, but fabrics of various kinds, including curtains, sceneries, bedding, and other articles in theaters and hotels, as well as in family households, be rendered fire-proof when exposed to flame, or so that they will only char at their place of contact with the flame, but not ignite or blaze.

In carrying my invention into practice I take starch of the ordinary or any suitable kind, and which may be obtained in the usual manner from different kinds of grain, seeds, bulbous plants, and other articles or substances, and mix with the starch, before putting it up for market, the chemical substances by which the starch has its fire-proof character given it. Thus, after the disintegration of the seeds and other parts of plants containing starch by the usual methods—such as grinding, crushing, and washing—whereby the starch becomes liberated with or without the aid of fermentation or use of chemicals, and when the supernatant liquid in which the starch forms a sediment is drawn off, the residue, consisting of starch and water, I treat as follows: To every seven (7) parts, by weight, of this moist starch, which is equal to about four (4) parts of dried starch and three (3) parts of water, I add six (6) parts, by weight, (more or less,) of pure crystallized sulphate of ammonia and one-tenth ($\frac{1}{10}$) of a part, by weight, (more or less,) of pure crystallized boracic acid and thoroughly incorporate or mix the whole, either by hand or machinery, in any suitable vessel or vessels until a homogeneous mass is obtained. This may be done in ordinary starch-making apparatus, and when the fecula or particles of starch become thoroughly impregnated with the added substances the whole mass is subjected to evaporation or dried as ordinary starch is dried or in any other suitable manner. If desired, however, instead of mixing the sulphate of ammonia and boracic acid with the starch while in a moist state, the starch may first be dried separately—as, for instance, as it is ordinarily dried—and the sulphate of ammonia and boracic acid be thoroughly incorporated or mixed, either by hand or machinery, in any suitable vessel or vessels to obtain the same result; but in this case a greater proportionate quantity of the sulphate of ammonia and boracic acid for a given amount of the dry starch will be necessary than for the same given amount of the wet starch, on account of the absence of water in the dry starch, to give the same proportion of said substance to the actual starch—that is, for about every four (4) parts, by weight, of the plain dried starch about six (6) parts, by weight, of sulphate of ammonia and one-tenth ($\frac{1}{10}$) part, by weight of boracic acid. In either case—that is, whether the sulphate of ammonia and boracic acid be mixed with the moist starch, and the mass be subsequently dried or be mixed with the dried starch of commerce—the compound is the same, and constitutes a fire-proof starch, ready, as a new article of manufacture, to be put upon the market for use as ordinary starch is used, and which will not injure the fabrics to which it is applied, but effectually makes them incapable of being inflamed or ignited into a blaze. Such article is very different to a mere solution of the same fire-proof ingredients, which, if applied before starching the goods, loses its effect, and if applied after ironing renders useless the act of ironing, the said solution, if applied after starching, making it impossible in many cases to iron clothes so prepared; and apart from these considerations is the fact that separately using a fire-proof solution is an independent operation which not only takes extra labor, but is very apt to be neglected when laundering goods, or the proportion of solution to be misapplied. My improved fire-proof starch removes all these objections. Of course the proportions of sulphate of ammonia and boracic acid herein named may be varied, and other ingredients be used in addition for mixture with the starch.

The improved compound or fire-proof starch may be put up as a dry powder for sale in bottles or other suitable packages to protect it from dampness. When using it the proportion may be about one part, by weight, of the starch to ten parts of boiling water, or about one part of starch, by measure, to seven parts of water, more or less.

Having thus described my invention, I claim as new and desire to secure by Letters Patent—

1. As a new article of manufacture, a fire-proof starch in which ordinary or plain dry starch has combined with it one or more chemical substances operating to prevent inflammability of goods or articles to which the starch may be applied, substantially as specified.

2. The combination, with starch, of crystallized sulphate of ammonia and crystallized boracic acid, the whole forming a fire-proof compound or starch for use essentially as described.

3. In a starch for rendering fabrics fire-proof or incapable of being inflamed, the mixture, in about the proportions specified, of crystallized sulphate of ammonia and crystallized boracic acid, with ordinary or plain starch, substantially as herein set forth.

JULIUS GÜNTHER.

Witnesses:
J. F. HUG,
B. ARNTZIER.